United States Patent
Noda (10) Patent No.: US 11,330,192 B2
(45) Date of Patent: May 10, 2022

(54) ACQUISITION METHOD, COMPUTER READABLE RECORDING MEDIUM AND IMAGE APPARATUS

(71) Applicant: Olympus Corporation, Hachioji (JP)

(72) Inventor: Masatoshi Noda, Tokyo (JP)

(73) Assignee: Olympus Corporation, Tokyo (JP)

( * ) Notice: Subject to any disclaimer, the term of this patent is extended or adjusted under 35 U.S.C. 154(b) by 39 days.

(21) Appl. No.: 17/114,372

(22) Filed: Dec. 7, 2020

(65) Prior Publication Data

US 2021/0092276 A1 Mar. 25, 2021

Related U.S. Application Data (63) Continuation of application No. PCT/JP2019/022040, filed on Jun. 3, 2019.

(30) Foreign Application Priority Data

Jun. 15, 2018 (JP) .............................. JP2018-114851

(51) Int. Cl.
*H04N 5/235* (2006.01)

(52) U.S. Cl.
CPC ......... *H04N 5/2357* (2013.01); *H04N 5/2351* (2013.01); *H04N 5/2353* (2013.01)

(58) Field of Classification Search
CPC .. H04N 5/2357; H04N 5/2351; H04N 5/2353; H04N 5/23245; G03B 7/093
See application file for complete search history.

(56) References Cited

U.S. PATENT DOCUMENTS

2014/0078358 A1\* 3/2014 Takenaka ............. H04N 5/2357 348/294
2014/0333825 A1 11/2014 Nakagawara
(Continued)

FOREIGN PATENT DOCUMENTS

JP 2012094937 A \* 5/2012
JP 2014-220764 A 11/2014
(Continued)

OTHER PUBLICATIONS

PCT International Search Report to corresponding International Application No. PCT/JP2019/022040 (4 pgs.), partial translation of second sheet (1 pg.).

*Primary Examiner* — Jason A Flohre
(74) *Attorney, Agent, or Firm* — John C. Pokotylo; Pokotylo Patent Services (57) ABSTRACT

An acquisition method includes: acquiring a first image without a flicker band; acquiring a second image with the flicker band; generating a third image of an extracted flicker band based; determining a division method of dividing the third image; dividing the third image into a plurality of areas based on the division method; calculating brightness of each area of the third image; acquiring at least one of a brightest value of the brightness and a darkest value of the brightness; acquiring peak timing of the flicker; calculating the number of frames captured by an image sensor to detect the peak timing; causing the image sensor to continuously capture images to generate a plurality of pieces of image data; acquiring the first image from the plurality of pieces of image data; and acquiring the second image from the plurality of pieces of image data.

20 Claims, 7 Drawing Sheets

(56) References Cited

U.S. PATENT DOCUMENTS

| | | | |
|---|---|---|---|
| 2015/0116537 A1 | 4/2015 | Ariga | |
| 2016/0028934 A1* | 1/2016 | Sugawara | H04N 5/2353 |
| | | | 348/226.1 |
| 2016/0330359 A1* | 11/2016 | Ariga | H04N 5/3532 |
| 2019/0037157 A1* | 1/2019 | Matsumura | H04N 5/343 |
| 2019/0215434 A1 | 7/2019 | Suzuki et al. | |
| 2020/0344401 A1* | 10/2020 | Izuta | H04N 5/235 |

FOREIGN PATENT DOCUMENTS

| | | |
|---|---|---|
| JP | 2015-088917 A | 5/2015 |
| JP | 2017126918 A * | 7/2017 |
| JP | 6220225 B2 | 10/2017 |
| WO | WO 2017/217137 A1 | 12/2017 |

* cited by examiner

ACQUISITION METHOD, COMPUTER READABLE RECORDING MEDIUM AND IMAGE APPARATUS

CROSS-REFERENCE TO RELATED APPLICATION

This application is a continuation of PCT international application Ser. No. PCT/JP2019/022040, filed on Jun. 3, 2019 which designates the United States, incorporated herein by reference, and which claims the benefit of priority from Japanese Patent Applications No. 2018-114851, filed on Jun. 15, 2018, incorporated herein by reference.

BACKGROUND

1. Technical Field

The present disclosure relates to an acquisition method, a computer readable recording medium, and an image apparatus configured to acquire imaging timing for capturing an image at peak timing of flicker.

2. Related Art

In a recent image apparatus such as a digital camera, there is known a technology for adjusting capturing timing so that timing at which the amount of light from a flickering source has a maximum value matches imaging timing (e.g., JP 2015-88917 A). In this technology, timing at which a change in amount of light of the flicker is smaller is detected on the basis of a first image with uneven exposure due to flicker of the light source, and a second image is captured at the detected timing, thereby reducing the influence of the flicker on the exposure of a still image.

SUMMARY

In some embodiments, provided is an acquisition method of acquiring peak timing at which a change in amount of light due to flicker of a light source has a minimum value. The method includes: acquiring a first image without a flicker band from an image sensor based on a flicker cycle detected in advance; acquiring a second image with the flicker band from the image sensor based on the flicker cycle; generating a third image of an extracted flicker band based on the first image and the second image; determining a division method of dividing the third image based on at least one of a reading direction in which an image signal is read from the image sensor, a metering area in an imaging area of the image sensor, and pixels constituting the image sensor; dividing the third image into a plurality of areas in a horizontal direction based on the determined division method; calculating brightness of each area of the third image; acquiring at least one of a brightest value of the brightness and a darkest value of the brightness; acquiring peak timing of the flicker based on a position of at least one of the area having the brightest value and the area having the darkest value in the third image; calculating the number of frames captured by the image sensor to detect the peak timing based on the flicker cycle and a time required for curtain speed of an electronic shutter included in the image sensor; causing the image sensor to continuously capture images to generate a plurality of pieces of image data based on the calculated number of frames; acquiring the first image from the plurality of pieces of image data; and acquiring the second image from the plurality of pieces of image data.

In some embodiments, provided is a non-transitory computer readable recording medium recording an executable program. The program causes a computer to execute: acquiring a first image without a flicker band from an image sensor based on a flicker cycle detected in advance; acquiring a second image with the flicker band from the image sensor based on the flicker cycle; generating a third image of an extracted flicker band based on the first image and the second image; determining a division method of dividing the third image based on at least one of a reading direction in which an image signal is read from the image sensor, a metering area in an imaging area of the image sensor, and pixels constituting the image sensor; dividing the third image into a plurality of areas in a horizontal direction based on the determined division method, and calculating brightness of each area of the third image; acquiring at least one of a brightest value of the brightness and a darkest value of the brightness; acquiring peak timing at which a change in amount of light due to flicker of a light source has a minimum value, based on a position of at least one of the area having the brightest value and the area having the darkest value in the third image; calculating the number of frames captured by the image sensor to detect the peak timing, based on the flicker cycle and a time required for curtain speed of an electronic shutter included in the image sensor; causing the image sensor to continuously capture images to generate a plurality of pieces of image data based on the calculated number of frames; acquiring the first image from the plurality of pieces of image data; and acquiring the second image from the plurality of pieces of image data.

In some embodiments, an image apparatus includes: an image sensor configured to generate an image; a controller configured to control the image sensor; and a photometric controller configured to acquire peak timing at which a change in amount of light due to flicker of a light source has a minimum value, from the image. The photometric controller is configured to: acquire a first image without a flicker band from an image sensor based on a flicker cycle detected in advance; acquire a second image with the flicker band from the image sensor based on the flicker cycle; generate a third image of an extracted flicker band based on the first image and the second image; determine a division method of dividing the third image based on at least one of a reading direction in which an image signal is read from the image sensor, a metering area in an imaging area of the image sensor, and pixels constituting the image sensor; divide the third image into a plurality of areas in a horizontal direction based on the determined division method, calculate brightness of each area of the third image; acquire at least one of a brightest value of the brightness and a darkest value of the brightness; acquire peak timing based on a position of at least one of the area having the brightest value and the area having the darkest value in the third image; calculate the number of frames captured by the image sensor to detect the peak timing based on the flicker cycle and a time required for curtain speed of an electronic shutter included in the image sensor; cause the image sensor to continuously capture images to generate a plurality of pieces of image data based on the number of frames; acquire the first image from the plurality of pieces of image data; and acquire the second image from the plurality of pieces of image data.

The above and other features, advantages and technical and industrial significance of this disclosure will be better understood by reading the following detailed description of presently preferred embodiments of the disclosure, when considered in connection with the accompanying drawings.

DETAILED DESCRIPTION

Embodiments for implementing the present disclosure (hereinafter referred to as "embodiments") will be described below with reference to the drawings. Note that the present disclosure is not limited to the following embodiments. Furthermore, in the drawings, the same portions are denoted by the same reference numerals. In addition, the drawings referred to in the following descriptions are merely schematically illustrated in shape, size, and positional relationship so as to understand the contents of the present disclosure. In other words, the present disclosure is not limited only to the shapes, sizes, and positional relationships exemplified in the drawings. Furthermore, in the following description, a digital still camera will be described as an example of the image apparatus.

Configuration of Image Apparatus

Figure 1:
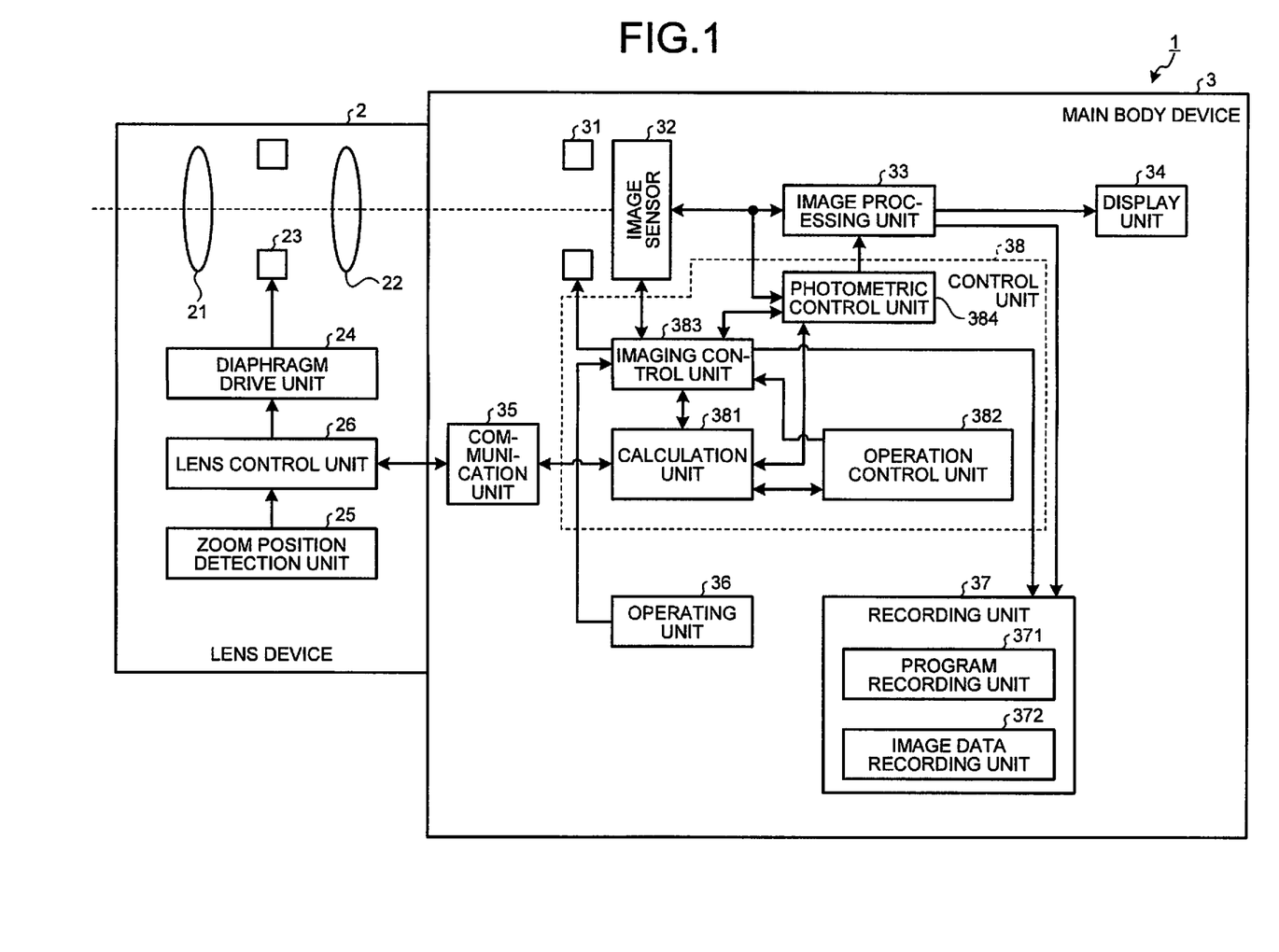
FIG. 1 is a block diagram illustrating a functional configuration of an image apparatus according to an embodiment of the present disclosure.

FIG. 1 is a block diagram illustrating a functional configuration of an image apparatus 1 according to an embodiment of the present disclosure. The image apparatus 1 illustrated in FIG. 1 includes a lens device 2 that forms a subject image and a main body device 3 to which the lens device 2 is removably mounted. Note that, in the following, the lens device 2 and the main body device 3 are configured separately, but the present disclosure is not limited to this, and the lens device 2 and the main body device 3 may be integrated with each other.

Configuration of Lens Device

A configuration of the lens device 2 will be described first.

The lens device 2 includes a front lens group 21, a rear lens group 22, a diaphragm 23, a diaphragm drive unit 24, a zoom position detection unit 25, and a lens control unit 26.

The front lens group 21 focuses light from a predetermined field of view in order to form an optical image (subject image) on a light receiving surface of an image sensor 32 of the main body device 3 which is described later. The front lens group 21 includes one or more lenses. Furthermore, the front lens group 21 moves along an optical axis L1 to change the angle of view.

The rear lens group 22 moves along the optical axis L1 to adjust a focus point of the subject image. The rear lens group 22 includes one or more lenses.

Under the control of the diaphragm drive unit 24, the diaphragm 23 limits an amount of input light focused by the front lens group 21 to adjust exposure.

The diaphragm drive unit 24 drives the diaphragm 23 under the control of the lens control unit 26 to adjust a diaphragm value of the diaphragm 23. The diaphragm drive unit 24 includes a stepping motor, a DC motor, or the like.

The zoom position detection unit 25 detects a position of the front lens group 21 on the optical axis L1, detects zoom information about the current angle of view of the lens device 2, and outputs this zoom information to the lens control unit 26. The zoom position detection unit 25 includes, for example, a photo interrupter, an encoder, or the like.

The lens control unit 26 controls the diaphragm drive unit 24 on the basis of a control signal input from the main body device 3 to control the diaphragm 23. The lens control unit 26 includes, for example, a central processing unit (CPU).

Configuration of Main Body Device

A configuration of the main body device 3 will be described next.

The main body device 3 includes a shutter 31, the image sensor 32, a communication unit 35, an image processing unit 33, a display unit 34, an operating unit 36, a recording unit 37, and a control unit 38.

Under the control of the control unit 38, the shutter 31 performs an opening/closing operation to switch the state of the image sensor 32 between an exposure state and a light-shielding state. Furthermore, the shutter 31 adjusts a shutter speed that is an input time of light input to the image sensor 32, under the control of the control unit 38. The shutter 31 includes a mechanical shutter such as a focal plane shutter.

The image sensor 32 includes an image sensor such as a complementary metal oxide semiconductor (CMOS) in which a plurality of pixels receiving a subject image formed by focusing light by the lens device 2, performing photoelectric conversion, and generating image data are arranged in a two-dimensional matrix. Under the control of the control unit 38, the image sensor 32 generates image data at a predetermined frame rate and outputs the image data to the image processing unit 33. Furthermore, under the control of the control unit 38, the image sensor 32 sequentially reads pixel lines in horizontal directions by using electronic shutter, for example, rolling shutter and outputs the image data to the image processing unit 33. Furthermore, the image sensor 32 may perform global shutter under the control of the control unit 38. The image sensor 32 has a Bayer array color filter on the light receiving surface. As a matter of course, the image sensor 32 may be provided with a filter for detecting a phase difference, in addition to the Bayer array, in the Bayer array color filter. Furthermore, the image sensor 32 may be provided with a complementary color filter, for example, a complementary color filter in which magenta, yellow, and cyan filters are arranged, in addition to the Bayer array.

The communication unit 35 transmits a control signal input from the control unit 38 to the lens control unit 26 of the lens device 2 and outputs various signals input from the lens control unit 26, for example, a signal including the angle of view of the lens device 2, to the control unit 38. The communication unit 35 bidirectionally transmits and receives control signals and various signals in a wired or wireless manner, according to a predetermined communication standard.

The image processing unit 33 performs predetermined image processing on image data input from the image sensor 32 and outputs the image data to the display unit 34. The image processing unit 33 performs development processing such as gain-up, white balance adjustment, demosaicing and outputs the obtained image data to the display unit 34, the recording unit 37, and the control unit 38.

The display unit 34 displays an image or live view image corresponding to the image data input from the image processing unit 33. The display unit 34 includes an organic electro luminescence (EL) display panel, liquid crystal display panel, or the like.

The operating unit 36 receives inputs of various operations relating to the image apparatus 1. Specifically, the operating unit 36 receives an input of an instruction signal for instructing the image apparatus 1 to perform imaging or an instruction signal for changing an imaging drive mode of the image apparatus 1 and outputs the received instruction signal to the control unit 38. The operating unit 36 includes a touch panel, a switch, a button, a joystick, a dial, or the like.

The recording unit 37 records various information about the image apparatus 1. The recording unit 37 includes a program recording unit 371 that records various programs executed by the image apparatus 1 and an image data recording unit 372 that records image data. The recording unit 37 includes a volatile memory, a non-volatile memory, a recording medium, and the like.

The control unit 38 integrally controls the respective units constituting the image apparatus 1. The control unit 38 includes a CPU, a field programmable gate array (FPGA), an application specific integrated circuit (ASIC), and the like. The control unit 38 includes a calculation unit 381, an operation control unit 382, an imaging control unit 383, and a photometric control unit 384.

The calculation unit 381 calculates an optimum exposure for capturing an image by the image apparatus 1, on the basis of image data generated by the image sensor 32 and a photometric result of photometry by the photometric control unit 384.

The operation control unit 382 controls the shutter speed of the shutter 31 and the operation of the diaphragm 23 on the basis of a calculation result of calculation performed by the calculation unit 381.

The imaging control unit 383 controls the operation of the image sensor 32. Specifically, the imaging control unit 383 controls the imaging frame rate (display frame rate) and ISO sensitivity of the image sensor 32. Furthermore, when an instruction signal for imaging is input from the operating unit 36, the imaging control unit 383 causes the image sensor 32 to perform imaging on the basis of a photometric result of photometry by the photometric control unit 384 and a detection result of detection of peak timing of flicker.

The photometric control unit 384 acquires a first image without a flicker band from the image sensor 32 on the basis of a flicker cycle detected in advance, acquires a second image with the flicker band from the image sensor 32 on the basis of the flicker cycle, generates a third image of an extracted flicker band on the basis of the first image and the second image, determines a division method of dividing the third image on the basis of at least one of a reading direction in which an image signal is read from the image sensor 32, a metering area in an imaging area of the image sensor 32, and pixels constituting the image sensor 32, divides the third image into a plurality of areas in a horizontal direction on the basis of the division method, calculates brightness of each of the plurality of areas, acquires at least one of the brightest value of brightness and the darkest value of brightness, and acquires peak timing on the basis of the position of at least one of an area having the brightest value and an area having the darkest value in the third image.

Process Performed by Image Apparatus

Next, a process performed by the image apparatus 1 will be described.

Figure 2:
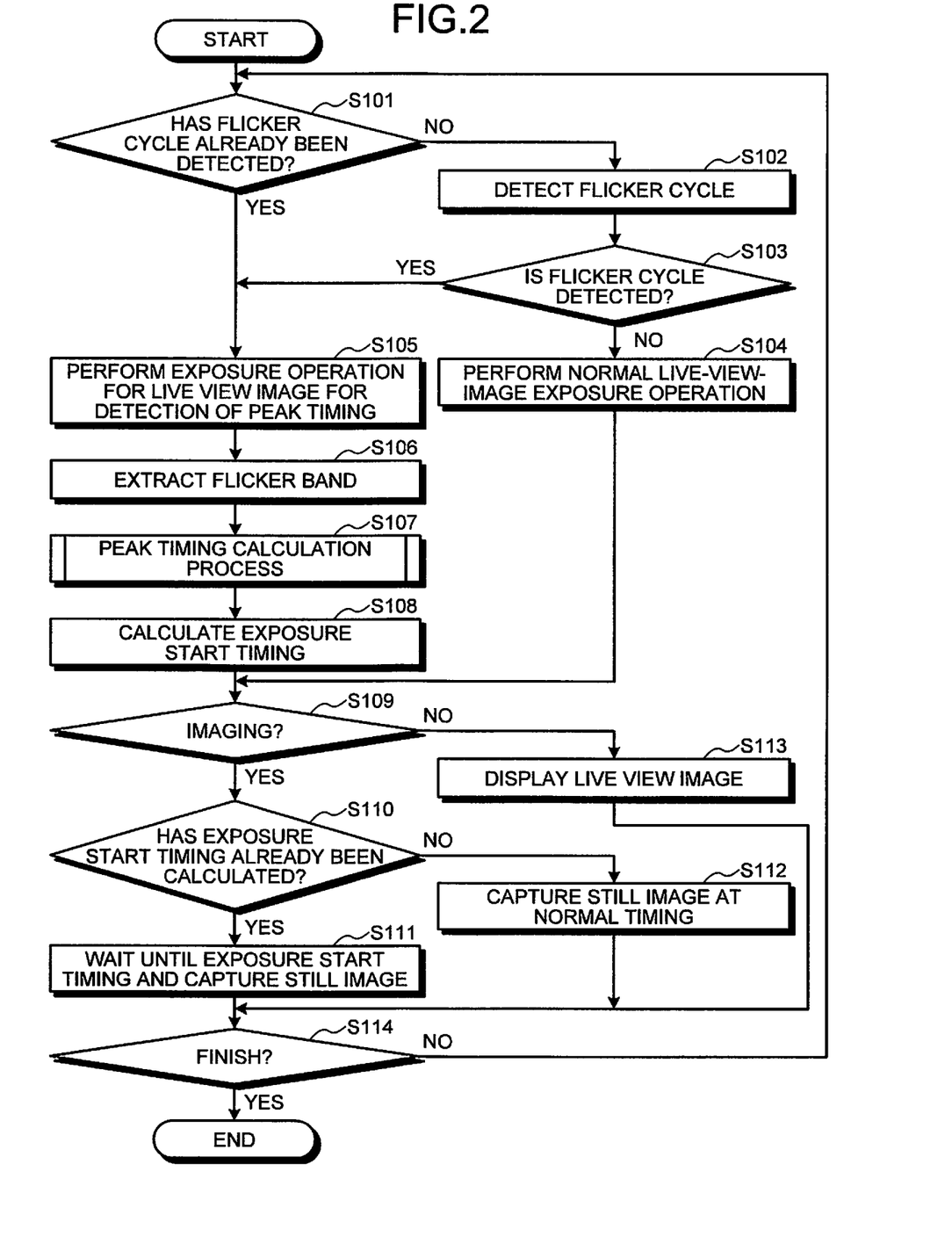
FIG. 2 is a schematic flowchart illustrating a process performed by an image apparatus according to an embodiment of the present disclosure.

FIG. 2 is a schematic flowchart illustrating a process performed by the image apparatus 1.

As illustrated in FIG. 2, if the image apparatus 1 has already detected a flicker cycle of the light source (Step S101: Yes), the image apparatus 1 proceeds to Step S105 which is described later. Conversely, if the image apparatus 1 has not already detected the flicker cycle of the light source (Step S101: No), the image apparatus 1 proceeds to Step S102 which is described later.

In Step S102, the image apparatus 1 detects the flicker cycle to detect the flicker cycle of the light source. Specifically, the photometric control unit 384 uses a well-known technique to detect the flicker cycle of the light source. For example, the photometric control unit 384 detects the flicker cycle (e.g., 50 Hz or 60 Hz) of the light source, from two live view images adjacent timewise of a plurality of live view images corresponding to image data generated by the image sensor 32, on the basis of a distance or position in a vertical direction relative to a horizontal line where flicker has occurred.

Subsequently, if the photometric control unit 384 detects the flicker cycle (Step S103: Yes), the image apparatus 1 proceeds to Step S105 which is described later. Conversely, if the photometric control unit 384 does not detect the flicker cycle (Step S103: No), the image apparatus 1 proceeds to Step S104, which will be described later.

In Step S104, the imaging control unit 383 causes the image sensor 32 to perform exposure operation for a normal live view image to generate a normal live view image. Specifically, the imaging control unit 383 controls the drive of the image sensor 32 so as to have an appropriate exposure, on the basis of a brightness value that is calculated by the photometric control unit 384 by using photometry on the basis of the image data generated by the image sensor 32. After Step S104, the image apparatus 1 proceeds to Step S109, which is described later.

In Step S105, the imaging control unit 383 controls an exposure time Tv and ISO sensitivity Sv of the image sensor 32 and thereby causes the image sensor 32 to perform exposure operation for a live view image for detection of peak timing to detect flicker of the light source. Specifically, the imaging control unit 383 causes the image sensor 32 to generate a first live view image that is a live view image without a flicker band and a second live view image that is a live view image with a flicker band, on the basis of the flicker cycle.

Subsequently, the photometric control unit 384 performs a flicker band extraction process extracting a flicker band on the basis of the first live view image and second live view image generated in Step S105 (Step S106). After Step S106, the image apparatus 1 proceeds to Step S107, which is described later.

Figure 3:
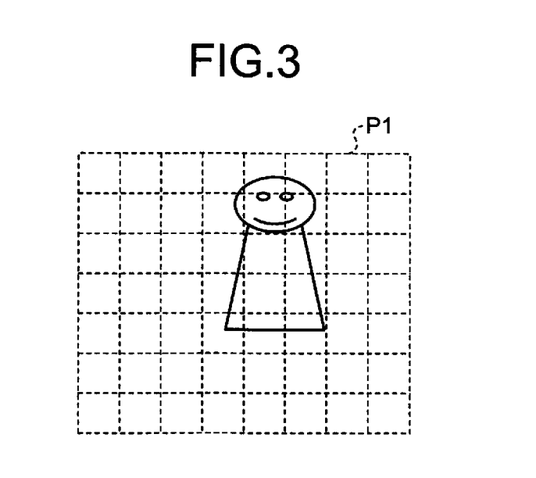
FIG. 3 is a diagram schematically illustrating a first live view image without a flicker band.
Figure 4:
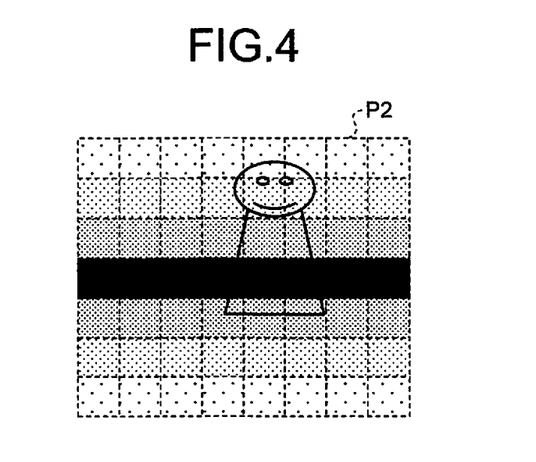
FIG. 4 is a diagram schematically illustrating a second live view image with a flicker band.
Figure 5:
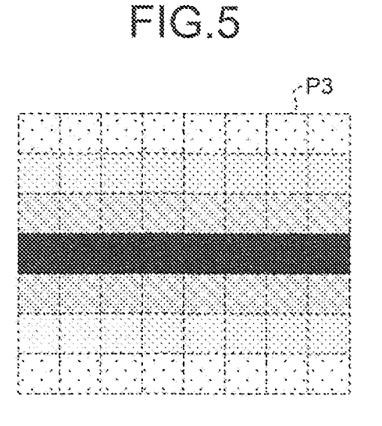
FIG. 5 is a diagram illustrating an image of an extracted flicker band.
Figure 6:
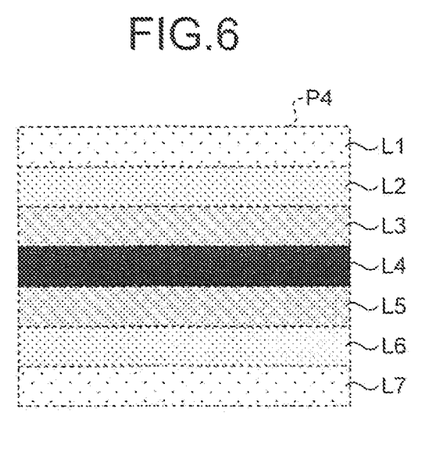
FIG. 6 is a diagram schematically illustrating subject brightness values By obtained by averaging brightness of each area in a horizontal direction.

FIG. 3 is a diagram schematically illustrating the first live view image without a flicker band. FIG. 4 is a diagram schematically illustrating the second live view image with a flicker band. FIG. 5 is a diagram illustrating an image of an extracted flicker band. FIG. 6 is a diagram schematically illustrating subject brightness values By obtained by averaging subject brightness of each metering area in a horizontal direction.

As illustrated in FIGS. 3 to 6, the photometric control unit 384 generates a third image P3 of an extracted flicker band on the basis of the first live view image P1 and the second live view image P2. Then, as illustrated in FIG. 6, the photometric control unit 384 generates a third image P4 obtained by averaging subject brightness values By of each metering area in the horizontal direction of the third image P3.

Returning to FIG. 2, the description will be continued from Step S107.

In Step S107, the photometric control unit 384 performs a peak timing calculation process of calculating peak timing at which a change in amount of light from the light source has a minimum value. After Step S107, the image apparatus 1 proceeds to Step S108, which is described later.

Peak Timing Calculation Process

Figure 7:
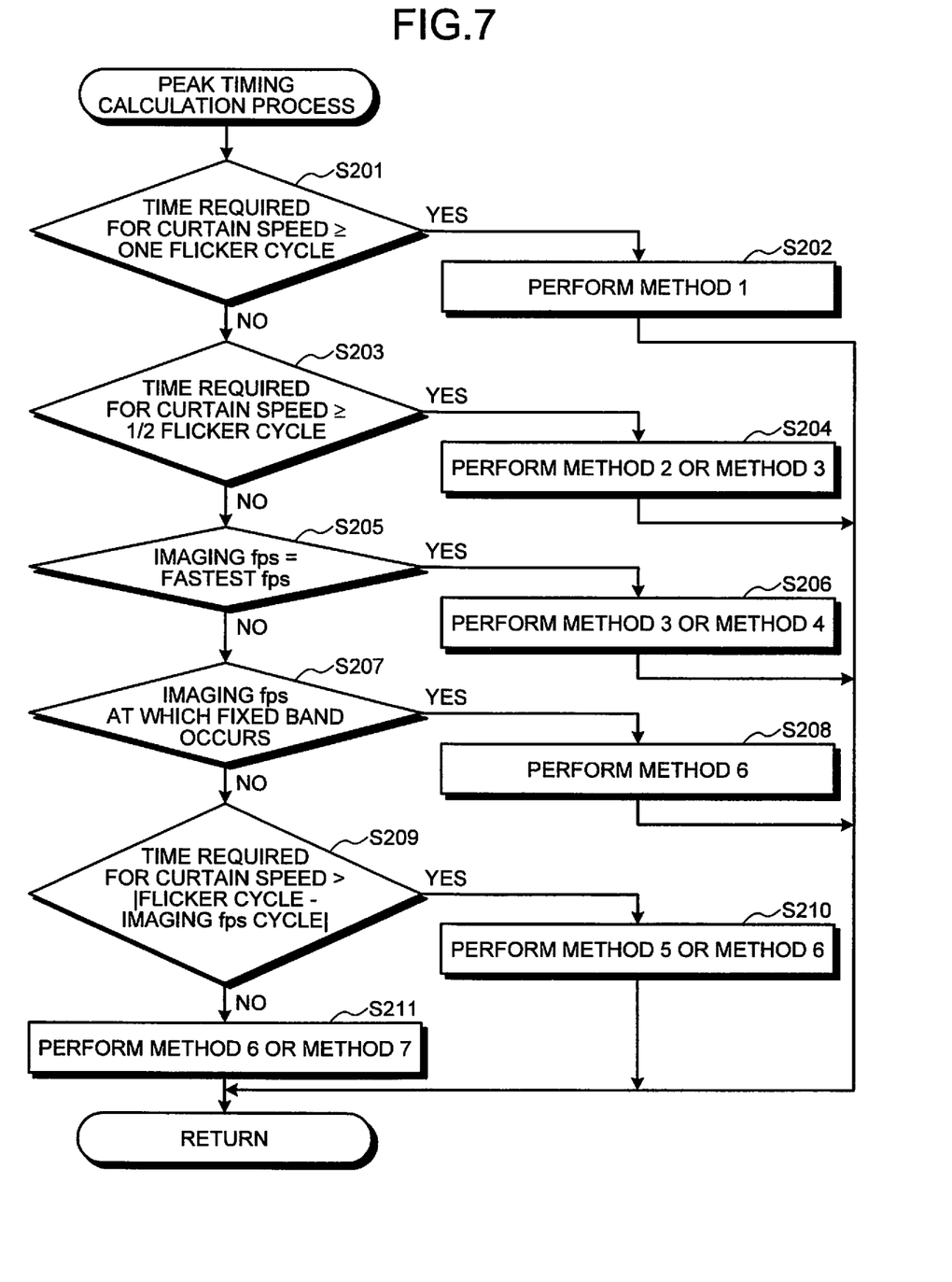
FIG. 7 is a schematic flowchart illustrating a peak timing calculation process of FIG. 2.

FIG. 7 is a schematic flowchart illustrating the peak timing calculation process in Step S107 of FIG. 2 which is described above.

As illustrated in FIG. 7, first, if a time required for curtain speed of the electronic shutter of the image sensor 32 is longer than a time of one flicker cycle (Step S201: Yes), the photometric control unit 384 performs a method 1 (Step S202). After Step S202, the image apparatus 1 returns to a main routine of FIG. 2.

Method 1

Here, the method 1 performed by the photometric control unit 384 will be described.

The photometric control unit 384 acquires peak timing at which a change in amount of light due to flicker of the light source has a minimum value, on the basis of an average value (hereinafter referred to as "average value ΔBvEx_XAve") obtained by averaging the subject brightness values By in each horizontal direction of the third image P4 illustrated in FIG. 6. Specifically, the photometric control unit 384 identifies peak timing of flicker on the basis of the position of an average value ΔBvEx_XAve having the maximum value or minimum value, of the average values ΔBvEx_XAve of the respective areas L1 to L7 of the third image P4. For example, in FIG. 6, the photometric control unit 384 identifies the peak timing of the flicker on the basis of the position of an area L4 of the third image P4 where the average value ΔBvEx_XAve has the minimum value. In this case, the photometric control unit 384 identifies, as the peak timing, a position shifted by ½ (hereinafter referred to as "½ flicker cycle") of the flicker cycle from the position of the area L4 of the third image P4 where the average value ΔBvEx_XAve has the minimum value. Note that in FIG. 6, the photometric control unit 384 identifies the peak timing of flicker on the basis of the position where the average value ΔBvEx_XAve has the minimum value, but of course, the peak timing of the flicker may be identified on the basis of the position where the average value ΔBvEx_XAve has the maximum value. In this case, the photometric control unit 384 identifies the position where the average value ΔBvEx_XAve has the maximum value, as the peak timing.

In Step S201, if the time required for curtain speed of the electronic shutter of the image sensor 32 is not longer than the time of one flicker cycle (Step S201: No), the image apparatus 1 proceeds to Step S203.

Subsequently, if the time required for curtain speed of the electronic shutter of the image sensor 32 is longer than a time of ½ flicker cycle (Step S203: Yes), the photometric control unit 384 performs a method 2 or method 3 (Step S204). After Step S204, the image apparatus 1 returns to the main routine of FIG. 2.

Method 2

Here, the method 2 performed by the photometric control unit 384 will be described.

When the time required for curtain speed of the electronic shutter is equal to or longer than the ½ flicker cycle and less than the one flicker cycle, generation of a flicker band in an image of one frame has three patterns. Specifically, the three patterns in which a flicker band is caused in one image include a pattern in which only one dark band is caused in an image (hereinafter, simply referred to as "pattern 1"), a pattern in which one dark band and one bright band are caused in an image (hereinafter, simply referred to as "pattern 2"), and a pattern in which only one bright band is caused in an image (hereinafter, simply referred to as "pattern 3").

In other words, the photometric control unit 384 determines whether or not the pattern 1, the pattern 2, or the pattern 3 is generated and, according to a result of the determination, identifies the peak timing of the flicker based on the dark band or identifies the peak timing on the basis of the bright band. Specifically, the photometric control unit 384 identifies the peak timing of flicker, in an image, on the basis of a position of at least one of an average value ΔBvEx_XAve having the brightest value that is the maximum value (hereinafter, simply referred to as "MAX") and an average value ΔBvEx_XAve having the darkest value that is the minimum value (hereinafter, simply referred to as "MIN"), of the average values ΔBvEx_XAve of the areas in the horizontal directions. More specifically, the photometric control unit 384 performs the following processes (1) to (3), determines one of the patterns 1 to 3, and identifies the peak timing of flicker using this result of the determination.

The process (1) will be described first. The photometric control unit 384 determines whether or not MAX is located at an upper end or lower end of an image, and when MAX is located at the upper end or lower end of the image, it is determined that the image has the pattern 1 or pattern 2. Then, the photometric control unit 384 identifies the position of MIN in the image as the dark band and identifies the peak timing of flicker on the basis of the position of the dark band.

The process (2) will be described next.

The photometric control unit 384 determines whether or not MAX is located at an upper end or lower end of an image, and when MAX is not located at the upper end or lower end of the image, it is determined whether or not MIN is at the upper end or lower end of the image, and when MIN is located at the upper end or lower end of the image, it is determined that the image has the pattern 3. Then, the photometric control unit 384 identifies a position of MAX in the image as the bright band, and identifies the peak timing of the flicker on the basis of the position of the bright band.

Finally, the process (3) will be described.

The photometric control unit 384 determines whether or not MAX is located at an upper end or lower end of an image, and when MAX is not located at the upper end or lower end of the image, it is determined whether MIN is at the upper end or lower end of the image, and when MIN is not located at the upper end or lower end of the image, it is determined that the image has the pattern 2. Then, the photometric control unit 384 identifies the position of MIN in the image as the dark band and identifies the peak timing of flicker on the basis of the position of the dark band.

In this way, when the time required for curtain speed of the electronic shutter is equal to or longer than the time of ½ flicker cycle and less than a time of one flicker cycle, the photometric control unit 384 determines whether or not an image has any of the patterns 1 to 3 on the basis of the position of MAX or MIN at an upper end or lower end of the image and identifies the peak timing of flicker on the basis of the position of the dark band or bright band in the image, according to a result of the determination.

Returning to FIG. 7, the description will be continued from Step S203.

In Step S203, if the time required for curtain speed of the electronic shutter of the image sensor 32 is not longer than the time of ½ flicker cycle (Step S203: No), the image apparatus 1 proceeds to Step S205.

Subsequently, if the current imaging frame rate (hereinafter referred to as "imaging fps") of the image sensor 32 is the fastest imaging fps in the imaging drive mode set in the image apparatus 1 (Step S205: Yes), the photometric control unit 384 performs the method 3 or a method 4 (Step S206). After Step S206, the image apparatus 1 returns to the main routine of FIG. 2.

Method 3 and Method 4

Here, the method 3 and method 4 performed by the photometric control unit 384 will be described.

When the time required for curtain speed of the electronic shutter of the image sensor 32 is less than the ½ flicker cycle, generation of a flicker band has two patterns. Specifically, the two patterns include a pattern in which flicker does not have MAX or MIN over frames (hereinafter, simply referred to as "pattern A"), and a pattern in which flicker has neither MAX nor MIN over frames (hereinafter, simply referred to as "pattern B").

Figure 8:
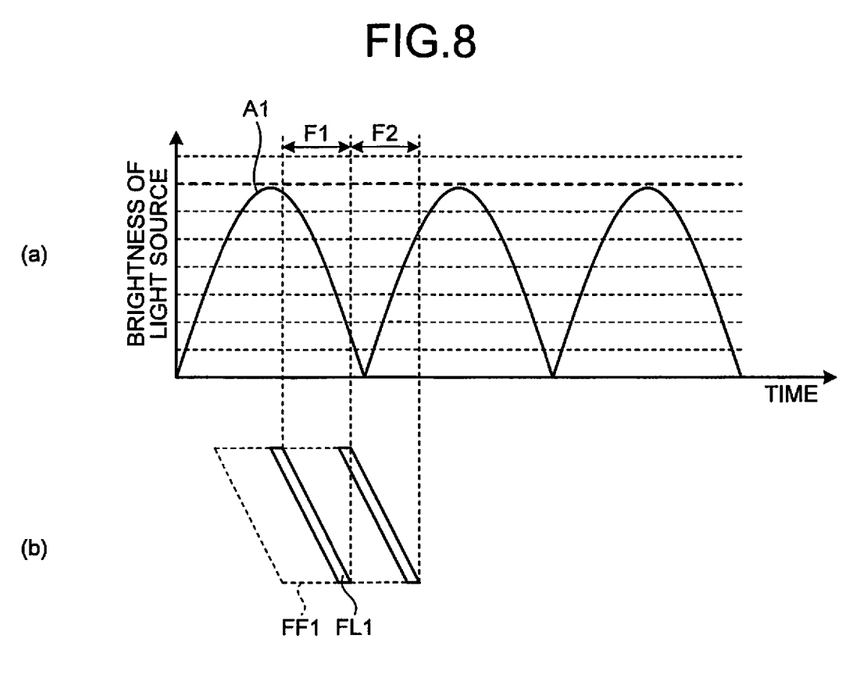
FIG. 8 is a diagram illustrating a relationship between a change in amount of light due to flicker and imaging timing.

FIG. 8 is a diagram illustrating a relationship between a change in amount of light due to flicker and imaging timing. In (a) of FIG. 8, a temporal change in amount of light due to flicker is illustrated, and in (b) of FIG. 8, imaging timing of the image sensor 32 is illustrated. In (a) of FIG. 8, the horizontal axis represents time, the vertical axis represents brightness (amount of light) of the light source, and a curve A1 represents flicker cycle. Furthermore, in (b) of FIG. 8, a dotted line FF1 represents a frame period of the image sensor 32, and a solid line FL1 represents an exposure period of the image sensor 32.

As represented by the curve A1 of FIG. 8, the pattern A does not have MAX or MIN in an exposure period F1 of the first frame. Furthermore, as represented by the curve A1 of FIG. 8, the pattern B does not have MAX in an exposure period F2 of the second frame.

Therefore, the photometric control unit 384 uses a plurality of frames of image so as to identify the peak timing of flicker. Specifically, the photometric control unit 384 calculates the number of frames used for determination, on the basis of the time required for curtain speed of the electronic shutter of the image sensor 32 and the time of a flicker cycle.

More specifically, the photometric control unit 384 divides the time of a flicker cycle for determining the peak timing by the time required for curtain speed of the electronic shutter of the image sensor 32 in the current imaging drive mode of the image apparatus 1, and thereby the number of frames used for determination is calculated (the number of frames=time of a flicker cycle/the time required for curtain speed of the electronic shutter of the image sensor 32). Note that the photometric control unit 384 rounds up the calculated number of frames to the nearest integer.

For example, in a case where the flicker cycle for identifying the peak timing is a ½ cycle of 100 Hz, the photometric control unit 384 divides the ½ cycle of 100 Hz by the time required for curtain speed of the electronic shutter of the image sensor 32 in the current imaging drive mode of the image apparatus 1, thereby calculating the number of frames used for determination ({(1/100) [sec]/2})/(time required for curtain speed of the electronic shutter of the image sensor 32 in the current imaging drive mode of the image apparatus 1 [sec]). Note that in a case where the time of a flicker cycle required to identify the peak timing is set to one flicker cycle, the photometric control unit 384 performs the method 3, and in a case where the time of a flicker cycle required to identify the peak timing is set to the ½ flicker cycle, the photometric control unit 384 performs the method 4.

Figure 9:
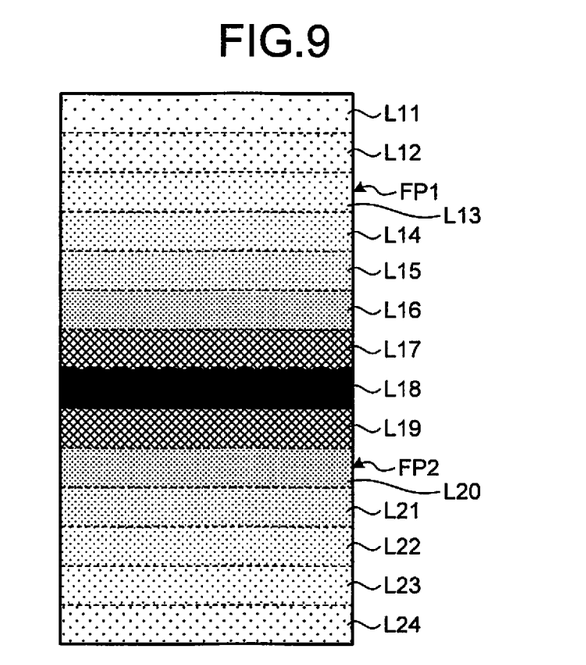
FIG. 9 is a diagram schematically illustrating an example of an image in which a plurality of frames are joined.

Then, the photometric control unit 384 calculates the average value ΔBvEx_XAve of the metering areas in each horizontal direction, assuming that the number of frames calculated by the above method is one. Specifically, as illustrated in FIG. 9, the photometric control unit 384 calculates the average value ΔBvEx_XAve of the metering areas L11 to L24 in the respective horizontal directions, assuming that an image FP1 and an image FP2 are regarded as one image. Then, in a case where the method 3 is employed, that is, the time of a flicker cycle required to identify the peak timing is set to one flicker cycle, the photometric control unit 384 identifies the peak timing by a method similar to the method 1 described above. Conversely, in a case where the method 4 is employed, that is, the time of a flicker cycle required to identify the peak timing is set to ½ flicker cycle, the photometric control unit 384 identifies the peak timing by a method similar to the method 2 described above.

Returning to FIG. 7, the description will be continued from Step S205.

In Step S205, if the current imaging fps of the image sensor 32 is not the fastest imaging fps in the imaging drive mode set in the image apparatus 1 (Step S205: No), the image apparatus 1 proceeds to Step S207.

Subsequently, if the current imaging fps is an imaging fps at which uneven exposure due to the flicker cycle becomes a fixed band (Step S207: Yes), the photometric control unit 384 performs a method 6 (Step S208). Specifically, in the method 6, the photometric control unit 384 changes the current imaging fps of the image sensor 32 to an imaging fps at which no fixed band is generated and, on the basis of the curtain speed of the electronic shutter of the image sensor 32 and the imaging fps, performs the above method 3 or method 4 or a method 5. Note that detailed descriptions of the method 3 and method 4 will be omitted. After Step S208, the image apparatus 1 returns to the main routine of FIG. 2.

Method 5

Here, the method 5 performed by the photometric control unit 384 will be described.

Figure 10:
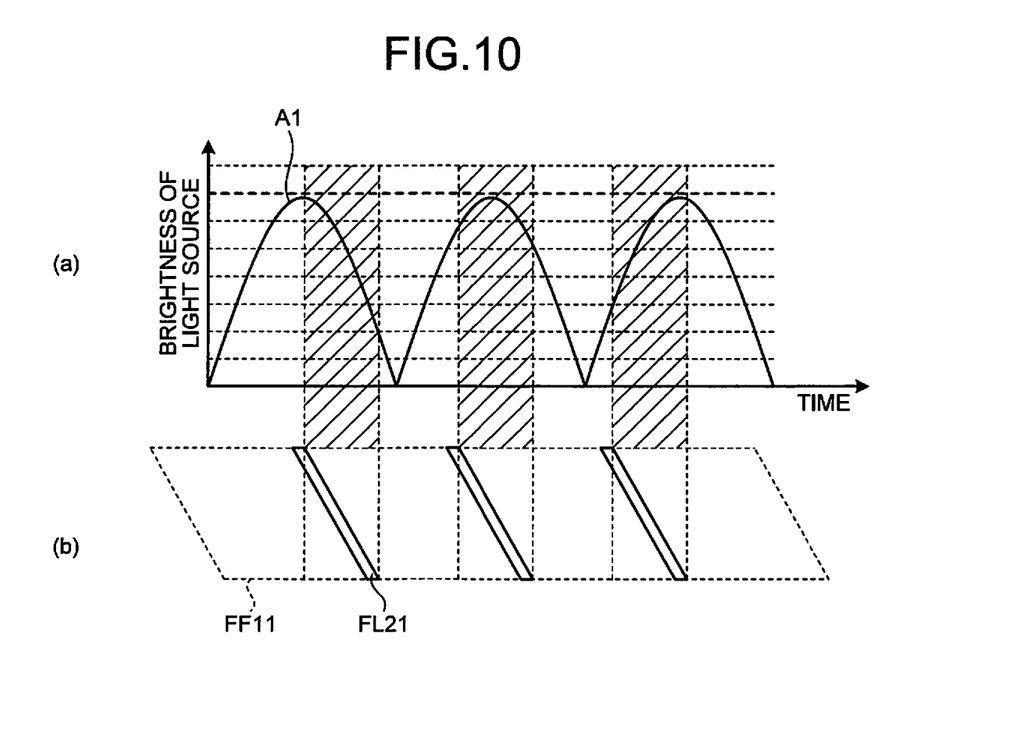
FIG. 10 is a diagram illustrating a relationship between a change in amount of light due to flicker and imaging timing.

FIG. 10 is a diagram illustrating a relationship between a change in amount of light due to flicker and imaging timing. In (a) of FIG. 10, a temporal change in amount of light due to flicker is illustrated, and in (b) of FIG. 10, imaging timing of the image sensor 32 is illustrated. In (a) of FIG. 10, the horizontal axis represents time, the vertical axis represents brightness (amount of light) of the light source, and a curve A1 represents flicker cycle. Furthermore, in (b) of FIG. 10, a dotted line FF11 represents a frame period of the image sensor 32, and a solid line FL21 represents an exposure period of the image sensor 32.

As illustrated in FIG. 10, when the current imaging fps of the image sensor 32 is lower than the fastest imaging fps in the imaging drive mode of the image apparatus 1, the photometric control unit 384 cannot perform the methods 3 and 4 described above.

Therefore, the method 5 focuses on a phase shift generated between the absolute value of a value obtained by subtracting a cycle of imaging fps from a flicker cycle and flicker in each frame. In other words, when the time required for curtain speed of the electronic shutter of the image sensor 32 is larger than the absolute value of a value obtained by subtracting a cycle of imaging fps from a flicker cycle, the photometric control unit 384 grasps a change in amount of light of flicker without any gaps on the basis of continuously capturing images. Specifically, an amount of phase shift in each frame is within an exposure period of the image sensor 32, and thereby the photometric control unit 384 causes the image sensor 32 to continuously capture images and identifies a change in flicker on the basis of a result of exposure of the frame. More specifically, the photometric control unit 384 divides the flicker cycle by the absolute value of a value obtained by subtracting the cycle of imaging fps from the flicker cycle to calculate the number of frames to be continuously captured (the number of frames=(flicker cycle/|(flicker cycle−imaging fps cycle)|)). Note that when a value obtained by dividing the flicker cycle by the absolute value of a value obtained by subtracting the cycle of imaging fps from the flicker cycle leaves a remainder, the photometric control unit 384 calculates a value rounded up to the nearest integer as the number of frames to be continuously captured. Then, the photometric control unit 384 identifies the peak timing of flicker, on the basis of the position of MAX or MIN in an image, from the average values ΔBvEx_XAve of the images according to the number of frames.

In Step S207, if the current imaging fps is not an imaging fps at which uneven exposure due to the flicker cycle becomes a fixed band (Step S207: No), the image apparatus 1 proceeds to Step S209, which is described later.

Subsequently, if the time required for curtain speed of the electronic shutter of the image sensor 32 is longer than the time obtained by subtracting the time of the cycle of imaging fps from the time of a flicker cycle (Step S209: Yes), the photometric control unit 384 performs the method 5 or the method 6 (Step S210). After Step S210, the image apparatus 1 returns to the main routine of FIG. 2.

In Step S209, if the time required for curtain speed of the electronic shutter of the image sensor 32 is not longer than the time obtained by subtracting the time of the cycle of imaging fps from the time of a flicker cycle (Step S209: No), the photometric control unit 384 performs the method 6 or a method 7 (Step S211). In the method 7, the current imaging fps is changed to an imaging fps at which the time required for curtain speed of the electronic shutter of the image sensor 32 is larger than the absolute value of a value obtained by subtracting the cycle of imaging fps from the flicker cycle and the fixed bands due to the flicker is not generated in the image. After Step S211, the image apparatus 1 returns to the main routine of FIG. 2.

Returning to FIG. 2, the description will be continued from Step S108.

In Step S108, the control unit 38 calculates exposure start timing for exposure of the image sensor 32, on the basis of the peak timing calculated in Step S107 described above and the frame rate of the imaging drive mode set in the image apparatus 1.

Then, if an instruction signal for imaging is input from the operating unit 36 (Step S109: Yes), the image apparatus 1 proceeds to Step S110, which is described later. Conversely, if no instruction signal for imaging is input from the operating unit 36 (Step S109: No), the image apparatus 1 proceeds to Step S113, which is described later.

In Step S110, if the exposure start timing has already been calculated (Step S110: Yes), the image apparatus 1 proceeds to Step S111, which is described later. Conversely, if the exposure start timing has not been calculated (Step S110: No), the image apparatus 1 proceeds to Step S112, which is described later.

In Step S111, the imaging control unit 383 causes the image sensor 32 to wait for the exposure start timing thereof until the peak timing of flicker identified by the photometric control unit 384 to capture a still image. After Step S111, the image apparatus 1 proceeds to Step S114, which is described later.

In Step S112, the control unit 38 causes the image sensor 32 to capture a still image at normal timing. After Step S112, the image apparatus 1 proceeds to Step S114, which is described later.

In Step S113, the control unit 38 causes the image sensor 32 to display a live view image on the display unit 34. After Step S113, the image apparatus 1 proceeds to Step S114, which is described later.

In Step S114, if an instruction signal is input to finish imaging, from the operating unit 36 (Step S114: Yes), the image apparatus 1 finishes the present process. Conversely, if no instruction signal is input to finish imaging, from the operating unit 36 (Step S114: No), the image apparatus 1 returns to Step S101 described above.

According to an embodiment of the present disclosure having been described above, it is possible to identify the peak timing at which a change in amount of light from the light source has a minimum value, without switching the imaging drive mode.

Furthermore, according to an embodiment of the present disclosure, it is not necessary to switch an imaging drive mode to an imaging drive mode having a slow curtain speed, and thus, it is possible to prevent an increase in processing time or complication of a system.

Other Embodiments

Various disclosures can be created by appropriately combining a plurality of elements disclosed in an embodiment of the present disclosure described above. For example, some elements of all the elements described in an embodiment of the present disclosure described above may be removed. Furthermore, the elements described in an embodiment of the present disclosure described above may be appropriately combined.

Furthermore, in an embodiment of the present disclosure, the word "unit" described above can be read as "means", "circuit" or the like. For example, the control unit can be read as control means or a control circuit.

Furthermore, a program executed by the image apparatus according to an embodiment of the present disclosure is provided in the form of installable or executable file data and recorded in a computer readable recording medium, such as a CD-ROM, a flexible disk (FD), a CD-R, a digital versatile disk (DVD), a USB medium, or a flash memory.

Alternatively, the program executed by the image apparatus according to an embodiment of the present disclosure may be configured to be stored on a computer connected to a network such as the Internet and provided by being downloaded via the network. Furthermore, the program executed by the image apparatus according to an embodiment of the present disclosure may be configured to be provided or distributed via a network such as the Internet.

It is noted that, in the descriptions of the flowcharts herein, a context between process steps has been clearly shown by using expressions, such as "first", "then", and "subsequently", but the order of process steps necessary to carry out the present disclosure is not uniquely defined by these expressions. In other words, the order of the process steps in the flowcharts described herein may be changed or modified within a consistent range. Furthermore, the program is not limited to a program including a simple branch process but may be a program branched by comprehensively determining more determination items. In that case, such an artificial intelligence technology as performing machine learning while repeating learning by encouraging the user to perform manual operation may be used together. In addition, deep learning may be performed by incorporating further complicated conditions through learning operation patterns performed by many experts.

Some embodiments of the present application have been described in detail with reference to the drawings, but these are provided by way of examples, and it is possible to carry out the present disclosure in other forms to which various modifications and improvements are made on the basis of the knowledge of those skilled in the art, including the modes described in the specification.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An acquisition method of acquiring peak timing at which a change in amount of light due to flicker of a light source has a minimum value, the method comprising:
   acquiring a first image without a flicker band from an image sensor based on a flicker cycle detected in advance;
   acquiring a second image with the flicker band from the image sensor based on the flicker cycle;
   generating a third image of an extracted flicker band based on the first image and the second image;
   determining a division method of dividing the third image based on at least one of a reading direction in which an image signal is read from the image sensor, a metering area in an imaging area of the image sensor, and pixels constituting the image sensor;
   dividing the third image into a plurality of areas in a horizontal direction based on the determined division method;
   calculating brightness of each area of the third image;
   acquiring at least one of a brightest value of the brightness and a darkest value of the brightness;
   acquiring peak timing of the flicker based on a position of at least one of the area having the brightest value and the area having the darkest value in the third image;
   calculating the number of frames captured by the image sensor to detect the peak timing based on the flicker cycle and a time required for curtain speed of an electronic shutter included in the image sensor;
   causing the image sensor to continuously capture images to generate a plurality of pieces of image data based on the calculated number of frames;
   acquiring the first image from the plurality of pieces of image data; and
   acquiring the second image from the plurality of pieces of image data.

2. The acquisition method according to claim 1, further comprising:
   determining whether or not the area having the darkest value and the area having the brightest value are located at an upper or a lower end of the third image;
   when the area having the darkest value is located at the upper or the lower end, acquiring the peak timing based on a position of the area having the darkest value in the third image; and
   when the area having the brightest value is located at the upper or the lower end, acquiring the peak timing based on a position of the area having the brightest value in the third image.

3. The acquisition method according to claim 1, further comprising:
   determining whether or not an imaging frame rate of the image sensor is the fastest in an imaging drive mode of an image apparatus including the image sensor; and
   when it is determined that the imaging frame rate of the image sensor is not the fastest in the imaging drive mode, changing the imaging frame rate of the image sensor to a fastest imaging frame rate in the imaging drive mode.

4. The acquisition method according to claim 1, further comprising:
   determining whether or not an imaging frame rate of the image sensor is the fastest in an imaging drive mode of an image apparatus including the image sensor;
   when it is determined that the imaging frame rate of the image sensor is not the fastest in the imaging drive mode, calculating the number of frames captured by the image sensor to detect the peak timing based on the flicker cycle and the imaging frame rate;
   causing the image sensor to continuously capture images by the number of frames to generate a plurality of pieces of image data;
   acquiring the first image from the plurality of pieces of image data; and
   acquiring the second image from the plurality of pieces of image data.

5. The acquisition method according to claim 4, further comprising
   calculating the number of frames by dividing the flicker cycle by an absolute value of a value obtained by subtracting a cycle of the imaging frame rate from the flicker cycle.

6. The acquisition method according to claim 4, further comprising:
  determining whether or not the time required for curtain speed of the electronic shutter included in the image sensor is larger than an absolute value of a value obtained by subtracting a cycle of the imaging frame rate of the image sensor from the flicker cycle; and
  when the time required for curtain speed is smaller than the absolute value, changing the imaging frame rate so that the time required for curtain speed is larger than the absolute value.

7. The acquisition method according to claim 1, further comprising:
  determining whether or not an imaging frame rate of the image sensor is the fastest in an imaging drive mode of an image apparatus including the image sensor;
  when it is determined that the imaging frame rate of the image sensor is not the fastest in the imaging drive mode, determining whether or not the time required for curtain speed of the electronic shutter included in the image sensor is larger than an absolute value of a value obtained by subtracting a cycle of the imaging frame rate of the image sensor from the flicker cycle;
  when the time required for curtain speed is larger than the absolute value, calculating the number of frames captured by the image sensor to detect the peak timing, based on the flicker cycle and the imaging frame rate;
  causing the image sensor to continuously capture images by the number of frames to generate a plurality of pieces of image data;
  acquiring the first image from the plurality of pieces of image data; and
  acquiring the second image from the plurality of pieces of image data.

8. A non-transitory computer readable recording medium recording an executable program, the program causing a computer to execute:
  acquiring a first image without a flicker band from an image sensor based on a flicker cycle detected in advance;
  acquiring a second image with the flicker band from the image sensor based on the flicker cycle;
  generating a third image of an extracted flicker band based on the first image and the second image;
  determining a division method of dividing the third image based on at least one of a reading direction in which an image signal is read from the image sensor, a metering area in an imaging area of the image sensor, and pixels constituting the image sensor;
  dividing the third image into a plurality of areas in a horizontal direction based on the determined division method, and calculating brightness of each area of the third image;
  acquiring at least one of a brightest value of the brightness and a darkest value of the brightness;
  acquiring peak timing at which a change in amount of light due to flicker of a light source has a minimum value, based on a position of at least one of the area having the brightest value and the area having the darkest value in the third image;
  calculating the number of frames captured by the image sensor to detect the peak timing, based on the flicker cycle and a time required for curtain speed of an electronic shutter included in the image sensor;
  causing the image sensor to continuously capture images to generate a plurality of pieces of image data based on the calculated number of frames;
  acquiring the first image from the plurality of pieces of image data; and
  acquiring the second image from the plurality of pieces of image data.

9. The recording medium according to claim 8, wherein the program further causes the computer to execute:
  determining whether or not the area having the darkest value and the area having the brightest value are located at an upper or a lower end of the third image;
  when the area having the darkest value is located at the upper or the lower end, acquiring the peak timing based on a position of the area having the darkest value in the third image; and
  when the area having the brightest value is located at the upper or the lower end, acquiring the peak timing based on a position of the area having the brightest value in the third image.

10. The recording medium according to claim 8, wherein the program further causes the computer to execute:
  determining whether or not an imaging frame rate of the image sensor is the fastest in an imaging drive mode of an image apparatus including the image sensor; and
  when it is determined that the imaging frame rate of the image sensor is not the fastest in the imaging drive mode, changing the imaging frame rate of the image sensor to a fastest imaging frame rate in the imaging drive mode.

11. The recording medium according to claim 8, wherein the program further causes the computer to execute:
  determining whether or not an imaging frame rate of the image sensor is the fastest in an imaging drive mode of an image apparatus including the image sensor;
  when it is determined that the imaging frame rate of the image sensor is not the fastest in the imaging drive mode, calculating the number of frames captured by the image sensor to detect the peak timing based on the flicker cycle and the imaging frame rate;
  causing the image sensor to continuously capture images by the number of frames to generate a plurality of pieces of image data;
  acquiring the first image from the plurality of pieces of image data; and
  acquiring the second image from the plurality of pieces of image data.

12. The recording medium according to claim 11, wherein the program further causes the computer to execute:
  calculating the number of frames by dividing the flicker cycle by an absolute value of a value obtained by subtracting a cycle of the imaging frame rate from the flicker cycle.

13. The recording medium according to claim 11, wherein the program further causes the computer to execute:
  determining whether or not the time required for curtain speed of the electronic shutter included in the image sensor is larger than an absolute value of a value obtained by subtracting a cycle of the imaging frame rate of the image sensor from the flicker cycle; and
  when the time required for curtain speed is smaller than the absolute value, changing the imaging frame rate so that the time required for curtain speed is larger than the absolute value.

14. The recording medium according to claim 8, wherein the program further causes the computer to execute:
  determining whether or not an imaging frame rate of the image sensor is the fastest in an imaging drive mode of an image apparatus including the image sensor;

when it is determined that the imaging frame rate of the image sensor is not the fastest in the imaging drive mode, determining whether or not the time required for curtain speed of the electronic shutter included in the image sensor is larger than an absolute value of a value obtained by subtracting a cycle of the imaging frame rate of the image sensor from the flicker cycle;

when the time required for curtain speed is larger than the absolute value, calculating the number of frames captured by the image sensor to detect the peak timing, based on the flicker cycle and the imaging frame rate;

causing the image sensor to continuously capture images by the number of frames to generate a plurality of pieces of image data;

acquiring the first image from the plurality of pieces of image data; and acquiring the second image from the plurality of pieces of image data.

15. An image apparatus comprising:
an image sensor configured to generate an image;
a controller configured to control the image sensor; and
a photometric controller configured to acquire peak timing at which a change in amount of light due to flicker of a light source has a minimum value, from the image, wherein
the photometric controller is configured to:
acquire a first image without a flicker band from an image sensor based on a flicker cycle detected in advance;
acquire a second image with the flicker band from the image sensor based on the flicker cycle;
generate a third image of an extracted flicker band based on the first image and the second image;
determine a division method of dividing the third image based on at least one of a reading direction in which an image signal is read from the image sensor, a metering area in an imaging area of the image sensor, and pixels constituting the image sensor;
divide the third image into a plurality of areas in a horizontal direction based on the determined division method,
calculate brightness of each area of the third image;
acquire at least one of a brightest value of the brightness and a darkest value of the brightness;
acquire peak timing based on a position of at least one of the area having the brightest value and the area having the darkest value in the third image;
calculate the number of frames captured by the image sensor to detect the peak timing based on the flicker cycle and a time required for curtain speed of an electronic shutter included in the image sensor;
cause the image sensor to continuously capture images to generate a plurality of pieces of image data based on the number of frames;
acquire the first image from the plurality of pieces of image data; and
acquire the second image from the plurality of pieces of image data.

16. The image apparatus according to claim 15, wherein the photometric controller is further configured to:
determine whether or not the area having the darkest value and the area having the brightest value are located at an upper or a lower end of the third image;
when the area having the darkest value is located at the upper or the lower end, acquire the peak timing based on a position of the area having the darkest value in the third image; and
when the area having the brightest value is located at the upper or the lower end, acquire the peak timing based on a position of the area having the brightest value in the third image.

17. The image apparatus according to claim 15, wherein the photometric controller is further configured to:
determine whether or not an imaging frame rate of the image sensor is the fastest in an imaging drive mode of an image apparatus including the image sensor; and
when it is determined that the imaging frame rate of the image sensor is not the fastest in the imaging drive mode, change the imaging frame rate of the image sensor to a fastest imaging frame rate in the imaging drive mode.

18. The image apparatus according to claim 15, wherein the photometric controller is further configured to:
determine whether or not an imaging frame rate of the image sensor is the fastest in an imaging drive mode of an image apparatus including the image sensor;
when it is determined that the imaging frame rate of the image sensor is not the fastest in the imaging drive mode, calculate the number of frames captured by the image sensor to detect the peak timing based on the flicker cycle and the imaging frame rate;
cause the image sensor to continuously capture images by the number of frames to generate a plurality of pieces of image data;
acquire the first image from the plurality of pieces of image data; and
acquire the second image from the plurality of pieces of image data.

19. The image apparatus according to claim 18, wherein the photometric controller is further configured to:
calculate the number of frames by dividing the flicker cycle by an absolute value of a value obtained by subtracting a cycle of the imaging frame rate from the flicker cycle.

20. The image apparatus according to claim 18, wherein the photometric controller is further configured to:
determine whether or not the time required for curtain speed of the electronic shutter included in the image sensor is larger than an absolute value of a value obtained by subtracting a cycle of the imaging frame rate of the image sensor from the flicker cycle; and
when the time required for curtain speed is smaller than the absolute value, change the imaging frame rate so that the time required for curtain speed is larger than the absolute value.

* * * * *